(No Model.)

B. G. LAMME.
ALTERNATING CURRENT GENERATOR.

No. 564,702. Patented July 28, 1896.

WITNESSES:
George Brown
H. C. Tener

INVENTOR,
Benjamin G. Lamme
BY Terry and MacKay
ATTORNEYS.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

ALTERNATING-CURRENT GENERATOR.

SPECIFICATION forming part of Letters Patent No. 564,702, dated July 28, 1896.

Application filed April 30, 1894. Serial No. 509,502. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Alternating-Current Generators, (Case No. 598,) of which the following is a specification.

My invention relates to alternate-current generators, and particularly to those known as "multipolar" generators.

The object of my invention is to supply a form of multipolar generator having a closed winding or coil, as in the Gramme arrangement, which shall be suitable for the generation of any desired number of phases of current for multiphase transmission of power by electricity.

My invention is illustrated in the accompanying drawings, wherein—

Figure 1:
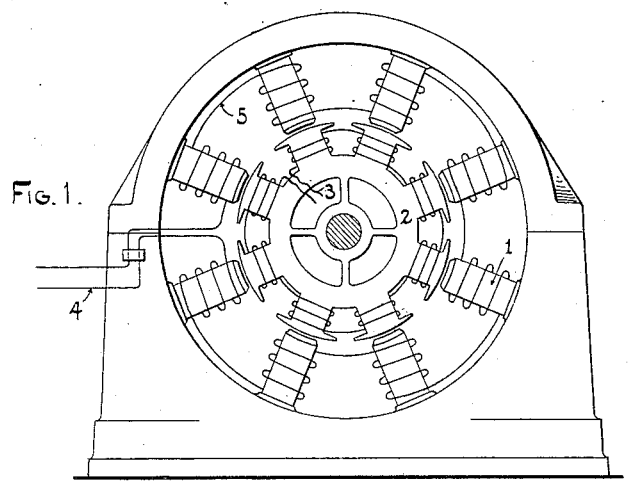
Figure 2:
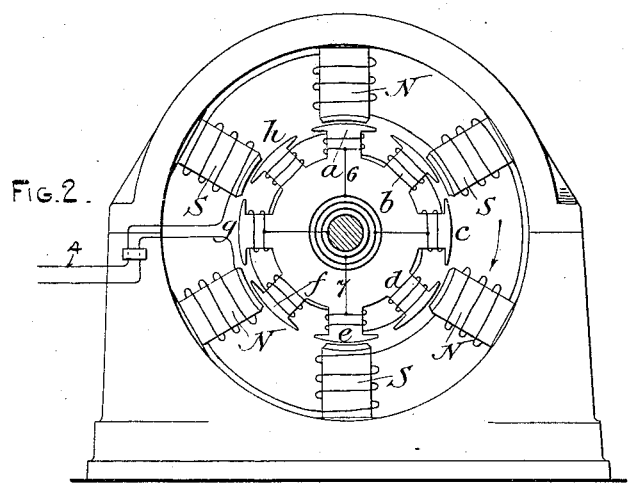
Figure 3:
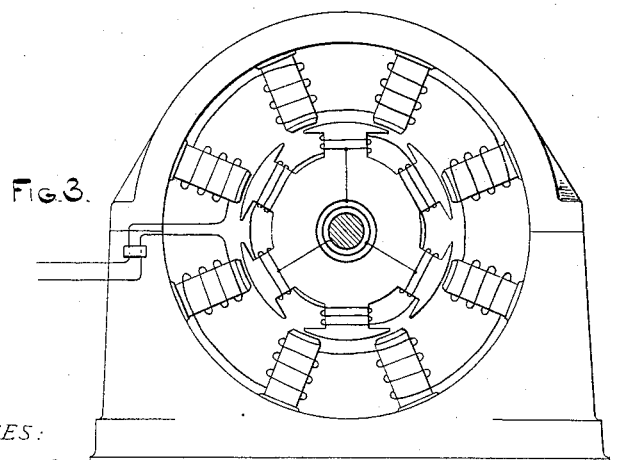

Figure 1 shows a well-known type of open-coil one-phase alternate-current generator. Fig. 2 shows one form of my improved generator adapted in the form shown for illustration to the production of two phases of current, and Fig. 3 is another modification of my invention adapted in the form shown for illustration to the production of three phases of current. Of course it will be understood that either of these forms is adapted to the production of any number of phases.

In old forms of multipolar alternate-current generators the field-magnet and armature are composed of radial poles equal in number in each member of the machine and bearing windings reversed in direction in alternate poles. This is shown in Fig. 1, where the field-magnet poles are shown at 1, the armature-poles at 2, and the open ends of the armature-coils are shown at 3. These ends are ordinarily attached to a pair of collector-rings, whence the current generated is taken off. The field-magnet is usually separately excited, as by the circuit 4. Upon analysis of the reactions taking place in the various armature-coils in this form of generator, as the armature revolves in one or the other direction, it will be seen that the electromotive forces are added up all the way around the armature, and thus the various coils coöperate to produce a one-phase current, or one phase of current, the phase being the same in all the coils at any one time. I have discovered, however, that if in lieu of this arrangement the number of armature-poles be either two more or two less than the number of field-magnet poles, and that adjacent coils be connected together so as to form a single closed-coil armature-winding, polyphase currents may be secured therefrom by making the necessary connections to the proper equidistant points. So far as I am aware this result cannot be attained with a winding such as is described above, unless the relation between the number of armature and field-magnet poles is either the one or the other of those above specified.

In Figs. 2 and 3 I have shown the two forms of my invention to which reference has already been made. Upon analysis of the magnetic reactions which take place in the various coils of the armature, at any one time, in each of the forms shown in these figures, it will be seen that there will always be a diameter of the armature, upon one side of which the coils are sending current in one direction around the armature, while on the other side of this diameter the coils are sending current in the opposite direction around the armature. For instance, in Fig. 2, supposing the armature to be revolving in the direction of the arrow, and considering first the armature-pole marked $a$, it is evident that as this pole is, at the moment shown, neither approaching nor moving away from the field-magnet pole opposite there will be no current set up in the coils surrounding it. The core marked $b$ is approaching a south pole, and we will suppose that this will set up currents in the coil surrounding the core $b$, which currents move away from the wire 6. The core $c$ is approaching a north pole and the current tendency in its coil will be in the opposite direction to the tendency in the coil around the core $b$. Inasmuch as the coil is wound on $c$ in the opposite direction from the winding on $b$, the resultant current will, however, be in the same direction with regard to the wire as that in the coil $b$, and consequently will move away from the wire 6. The core $d$ is approaching a south pole, and being wound in the same direction as the core $b$ will have a current moving in the same direction with regard to the wire. In the core $e$ no current is being induced, as it maintains the same relation to its armature-pole as the core $a$. The core $f$ is approaching a north pole and has therefore the opposite current tendency as regards its coil to the tendency in the coil around core $b$; but as these two cores are wound in the same direction the current tendency with relation to the wire will be in the opposite direction and will approach the wire 7. If now the cores $g$ and $h$ are considered, it will be seen that they coöperate with the core $f$ to induce a current in the coils, which approaches the wire 7 and moves away from the wire 6. It is thus seen that the current parts at 6, leaving it on each side and passing through the coils to reunite at 7. This is precisely like the Gramme ring, and, as the various coils are found on study to occupy such a relation to their corresponding field-magnet coils as to exhibit a maximum inductive action in the armature at each end of this diameter, the likeness to the Gramme ring is found to be complete. This being the case, it is evident that such an armature may be treated like a Gramme ring or like any form of armature wherein a closed coil is arranged to produce every potential from a maximum to zero in various parts of the armature. If, therefore, such an armature be tapped at points ninety degrees apart, as shown in Fig. 2, it will give two phases of current, if it is tapped at one hundred and twenty degrees it will give three phases, and so on. Fig. 2 shows the two-phase arrangement, and the three-phase arrangement is shown in Fig. 3, wherein the armature is seen to have two less poles than the field-magnet.

Upon studying the theoretical magnetic reactions in this form of generator it will be found to behave in the same way as that shown in Fig. 2; and my invention is intended to cover, broadly, a polyphase multipolar generator, in which the armature has either two more or two less poles than the field-magnet, and is provided with a closed-coil winding.

The details of arrangement beyond that set forth, and hereinafter claimed, are immaterial, and I do not wish to be understood as limiting myself in any way to such details.

What I claim is—

1. A polyphase, multipolar generator having a field-magnet and an armature, the number of poles in one of these members being two more than the number of poles in the other, and a closed coil upon the armature, substantially as described.

2. In a polyphase, multipolar generator, a field-magnet and an armature, one of said members having two more poles than the other, and said armature having a closed coil, in combination with circuits connected at a number of symmetrical points to the coil of the armature, substantially as described.

3. In a multipolar polyphase alternating-current generator, a field-magnet and an armature having two more poles than said field-magnet, and a closed coil carried by said armature, substantially as described.

In testimony whereof I have hereunto subscribed my name this 27th day of April, A. D. 1894.

BENJ. G. LAMME.

Witnesses:
JAS. W. SMITH,
HAROLD S. MACKAYE.